United States Patent
Miura et al.

(10) Patent No.: US 12,084,247 B2
(45) Date of Patent: Sep. 10, 2024

(54) POUCH AND LIQUID-CONTAINING POUCH

(71) Applicant: Toyo Seikan Co., Ltd., Tokyo (JP)

(72) Inventors: Takashi Miura, Yokohama (JP); Reina Atsumi, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 0 days.

(21) Appl. No.: 17/540,953

(22) Filed: Dec. 2, 2021

(65) Prior Publication Data
US 2022/0089348 A1   Mar. 24, 2022

Related U.S. Application Data

(63) Continuation of application No. PCT/JP2020/022075, filed on Jun. 4, 2020.

(30) Foreign Application Priority Data

Jun. 13, 2019   (JP) ................... 2019-110173

(51) Int. Cl.
*B65D 75/52*   (2006.01)
*B32B 1/00*   (2024.01)
(Continued)

(52) U.S. Cl.
CPC ............. *B65D 75/52* (2013.01); *B32B 1/00* (2013.01); *B32B 3/266* (2013.01); *B32B 27/08* (2013.01);
(Continued)

(58) Field of Classification Search
CPC .. B32B 1/00; B32B 3/10; B32B 3/266; B32B 7/022; B32B 7/05; B32B 27/08;
(Continued)

(56) References Cited

U.S. PATENT DOCUMENTS 6,368,758 B1 *   4/2002   Camp ................. G03C 7/3029
                                                            430/363

FOREIGN PATENT DOCUMENTS

JP   2001-231846 A   8/2001
JP   3087001 U   4/2002
(Continued)

OTHER PUBLICATIONS

English machine translation of the description of KR 20100058391 A obtained from ESPACENET (Year: 2010).*

(Continued)

*Primary Examiner* — Eli D. Strah
*Assistant Examiner* — Thomas J Kessler
(74) *Attorney, Agent, or Firm* — WHDA, LLP (57) ABSTRACT

An object of the present invention is to provide a pouch and a liquid-containing pouch having high resistance to falling breakage. A pouch (10) is a pouch formed into a bag by an outer peripheral sealing part (20). The pouch includes an accommodating part (30). A fragrance component emission part (40) is formed in the film on at least one side at a position corresponding to the accommodating part. The fragrance component emission part is composed of a material removal part (41) or a score having a notch form, in a range of part of the film in the thickness direction thereof. The tensile strength of the film in a fragrance component emission area in the width direction of the pouch is at least 90 N/50 mm, and the tensile strength thereof in the height direction of the pouch is at least 125 N/50 mm.

3 Claims, 5 Drawing Sheets

(51) Int. Cl.
*B32B 3/26* (2006.01)
*B32B 27/08* (2006.01)
*B32B 27/32* (2006.01)
*B32B 27/34* (2006.01)
*B32B 27/36* (2006.01)
*B65D 75/00* (2006.01)

(52) U.S. Cl.
CPC .............. *B32B 27/32* (2013.01); *B32B 27/34* (2013.01); *B32B 27/36* (2013.01); *B65D 75/008* (2013.01); *B32B 2250/03* (2013.01); *B32B 2250/24* (2013.01); *B32B 2255/10* (2013.01); *B32B 2255/205* (2013.01); *B32B 2307/54* (2013.01); *B32B 2439/40* (2013.01)

(58) Field of Classification Search
CPC ......... B32B 27/32; B32B 27/34; B32B 27/36; B32B 2250/03; B32B 2250/24; B32B 2255/10; B32B 2255/205; B32B 2307/54; B32B 2439/40; B32B 2439/46; B32B 2439/70; B65D 31/02; B65D 33/01; B65D 75/008; B65D 75/52; B65D 81/26; B65D 2205/02
See application file for complete search history.

(56) References Cited

FOREIGN PATENT DOCUMENTS

| | | |
|---|---|---|
| JP | 2005-47234 A | 2/2005 |
| JP | 2008-222307 A | 9/2008 |
| JP | 2012-86871 A | 5/2012 |
| JP | 5667461 B2 | 2/2015 |
| JP | 2019-26270 A | 2/2019 |
| KR | 20100058391 A * | 6/2010 |

OTHER PUBLICATIONS

International Search Report dated Jul. 28, 2020, issued in counterpart International Application No. PCT/JP2020/022075. (2 pages).

* cited by examiner

POUCH AND LIQUID-CONTAINING POUCH

TECHNICAL FIELD

The present invention relates to a pouch and a liquid-containing pouch which are each formed into a bag by thermally bonding a film to form an outer peripheral sealing part, and which each include an accommodating part, in which the liquid contents are contained, on the inside of the outer peripheral sealing part.

BACKGROUND ART

Conventionally, as containers in which the contents such as shampoo and detergent are stored, pouches that are each formed into a bag by thermally bonding a film to form an outer peripheral sealing part, and that each include an accommodating part, in which the liquid contents are contained, on the inside of the outer peripheral sealing part are widely used.

To form such pouches, gas-barrier properties, fragrance retention, etc., are generally given to films in order to prevent the contents in the pouches from leaking to the outside and in order to prevent the qualities of the contents therein from deteriorating. There is, however, a demand that fragrance components included in the contents be emitted to the outside when, for example, products are displayed so that consumers are encouraged to buy the products, in cases where the products such as shampoo, detergent, etc., the fragrance of which is one factor affecting the qualities thereof, are contained in pouches.

As innovation to emit fragrance components included in the contents to the outside, for example, the followings are known: creating to a container, in which the contents are contained, fragrance emission holes that penetrate through the container between the inside and the outside of the container so that fragrance components included in the contents are emitted to the outside as disclosed in Patent Literature 1; and providing a window part to be formed in a container, thereby exposing a perfume part sealed in the container to the outside so that fragrance components included in the contents are emitted to the outside as disclosed in Patent Literature 2.

CITATION LIST

Patent Literature

[Patent Literature 1] Japanese Patent Application Publication No. 2001-231846
[Patent Literature 2] Japanese Patent No. 5667461

SUMMARY OF INVENTION

Technical Problem

There are problems in the container disclosed in Patent Literature 1 as follows. The fragrance emission holes for emitting fragrance components included in the contents to the outside are formed so as to penetrate through the container between the inside and the outside of the container. Thus, if the contents are liquids such as a shampoo and a detergent: the use thereof may be disabled since the contents leak to the outside; and oxygen etc., invades the container from outside, whereby the qualities of the contents may deteriorate.

Similarly, there are problems in the container disclosed in Patent Literature 2 as follows. If the contents are liquids such as a shampoo and a detergent: opening the window part formed on the container results in leakage of the contents to the outside, and therefore the use thereof may be disabled; and opening the window part formed on the container also results in invasion of oxygen etc., into the container from outside, whereby the qualities of the contents may deteriorate.

Further, if a pouch contains the contents liquids such as a shampoo and a detergent, in particular, a fall of the pouch may cause falling breakage, in which the pouch is broken due to impacts of the fall, starting from fragrance emission holes or a window part as described above, which is also problematic.

Thus, the present invention is to solve these problems, and it is an object thereof to provide a pouch and a liquid-containing pouch having high resistance to falling breakage. The pouch and the liquid-containing pouch each have a simple structure and are each capable of emitting, to outside, fragrance components included in the liquid contents without opening the pouch, with leakage of the liquid contents to outside and deterioration of the qualities of the liquid contents being avoided.

Solution to Problem

A pouch according to the present invention is a pouch formed into a bag by thermally bonding a film to form an outer peripheral sealing part, the pouch including an accommodating part, in which liquid contents are stored, on an inside of the outer peripheral sealing part, wherein a fragrance component emission part is formed in the film on at least one side thereof at a position corresponding to the accommodating part, the fragrance component emission part is composed of at least one of a material removal part and a score, which has a notch form, in a range of part of the film in a thickness direction, the score being, and tensile strength of the film in a fragrance component emission area including the fragrance component emission part in a width direction of the pouch is at least 90 N/50 mm, and tensile strength thereof in a height direction of the pouch is at least 125 N/50 mm, whereby the problems are solved.

A liquid-containing pouch according to the present invention is a liquid-containing pouch including: the above pouch; and liquid contents stored in the accommodating part, wherein the pouch is formed as a standing pouch, and at least part of the fragrance component emission part is formed in a position across a liquid surface of the liquid contents, or in a position under the liquid surface, in a state where the pouch in an unopened state stands, whereby the problems are solved.

Advantageous Effects of Invention

According to the invention of claim 1, the fragrance component emission part is formed in the film on at least one side at a position corresponding to the accommodating part, and is composed of at least one of the material removal part and score, which has a notch form, in a range of part of the film in the thickness direction. This makes it possible to form the fragrance component emission part without penetration of the film, which forms the pouch, so that fragrance components included in the contents can be transmitted through the film corresponding to the fragrance component emission part and can be emitted to the outside without opening the pouch, as leakage of the contents to the outside and deterioration of the qualities of the contents caused by, for example, invasion of oxygen etc., into the pouch from the outside are avoided. Moreover, the fragrance component emission area including the fragrance component emission part has specific tensile strength such that the tensile strength of the film in the height direction of the pouch is at least 90 N/50 mm, and the tensile strength thereof in the width direction of the pouch is at least 125 N/50 mm. This can suppress falling breakage such that the pouch is broken due to the increase in hydraulic pressure because of impacts of the fall when the pouch falls, starting from the material removal part irrespective of a planar shape of the material removal part, and can offer high durability.

According to the invention of claim 2, the part of the square of 50 mm in length and 50 mm in width, which leads to the largest total area of the material removal part in the fragrance component emission area, has specific tensile strength. Thereby, part of the film corresponding to the fragrance component emission area where the material removal parts crowd most also has specific tensile strength although the tensile strength becomes lower when the material removal parts crowd and then lead to a larger total area thereof per unit area, which can suppress falling breakage such that the pouch is broken due to the increase in hydraulic pressure because of impacts of the fall when the pouch falls, starting from the material removal part irrespective of a planar shape of the material removal part, and which can offer higher durability.

According to the invention of claim 3, at least part of the fragrance component emission part is formed in a position across the liquid surface of the liquid contents, or in a position under the liquid surface, in a state where the pouch in an unopened state stands, whereby fragrance components included in the liquid contents are easily emitted through the fragrance component emission part, which can lead to stable emission of the fragrance components; and whereby, moreover, falling breakage in which the pouch is broken due to the increase in hydraulic pressure because of impacts of the fall when the pouch falls, starting from the material removal part can be suppressed irrespective of a planar shape of the material removal part, and high durability can be offered.

BRIEF DESCRIPTION OF DRAWINGS

FIG. 8A explanatorily shows an example of a pouch used in Experimental Example a.

DESCRIPTION OF EMBODIMENTS

A pouch 10 according to one embodiment of the present invention will be hereinafter described based on the drawings.

[Pouch]

Figure 1:
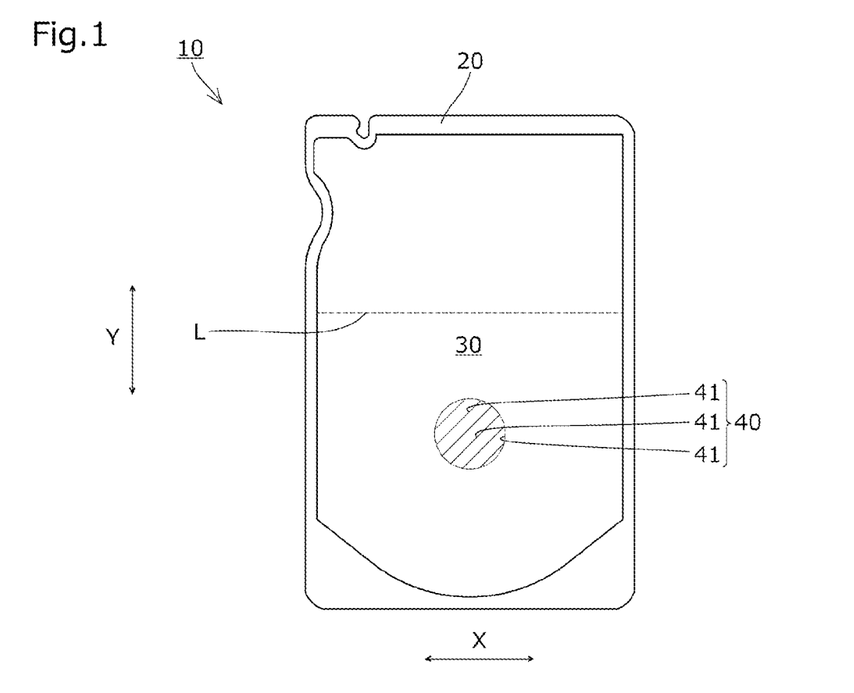
FIG. 1 explanatorily shows a pouch according to one embodiment of the present invention.

As shown in FIG. 1, the pouch 10 is formed into a bag by thermally bonding films 11 on both sides to form an outer peripheral sealing part 20. The pouch 10 includes an accommodating part 30 inside the outer peripheral sealing part 20 where the liquid contents are stored.

As shown in FIG. 1, a fragrance component emission part 40 for emitting fragrance components included in the liquid contents to the outside of the pouch 10 is formed on one of the films 11 on both sides at a position corresponding to an accommodating part 30 (that is, a place where the films 11 on both sides are not thermally bonded inside the outer peripheral sealing part 20).

As shown in FIG. 1, the fragrance component emission part 40 is composed of at least one kind of material removal parts 41 and scores in a form of notches which are formed in a range of part of the film 11 in the thickness direction (that is, such a range as not to penetrate the film 11 in the thickness direction). In this embodiment, the fragrance component emission part 40 is composed of the material removal parts 41 in the form of grooves which are formed from the outer surface of the film 11 (that is, the surface of the pouch 10 which faces the outside) to the middle of the film 11 in the thickness direction.

As described above, the material removal parts 41 (or scores) are formed on the film 11, whereby fragrance components in the contents may be transmitted through a thin portion of the film 11 (polyethylene layer 11$d$ in this embodiment) and emitted to the outside of the pouch 10 as the contents are prevented from leaking to the outside. In addition, the fragrance component emission part 40 is composed of the material removal parts 41 (or scores) in the form of grooves which are formed from the outer surface of the film 11 to the middle of the film 11 in the thickness direction, whereby the material removal parts 41 (or scores) in the form of grooves may be formed without complex processes or steps necessary, which makes it possible to avoid the increase in the load on production.

As shown in FIG. 1, the fragrance component emission part 40 is composed of a gathering of a plurality of the material removal parts 41 linearly extending along the plane of the pouch in a plan view of the pouch 10. When the material removal parts 41 each have a linear shape and are formed by laser irradiation, each line thereof has a width of, for example, at most 0.4 mm. Further, the fragrance component emission part 40 may be composed of a gathering of a plurality of the material removal parts 41 formed into a circle.

The total area of the material removal parts 41 along the plane of the pouch (that is, the total area of the material removal parts 41 in a plan view of the pouch 10) is set in 30 to 400 mm$^2$.

The fragrance component emission part 40 is composed of a gathering of the material removal parts 41 linearly extending along the plane of the pouch in a plan view of the pouch, whereby the fragrance components can be dispersed over and emitted into a wide area while the increase of the total area of the fragrance component emission part 40 along the plane of the pouch is suppressed. In addition, the total area of the material removal parts 41 composing the fragrance component emission part 40 along the plane of the pouch is set in 30 to 400 mm², whereby the fragrance components can be stably emitted so that fragrance of the contents can be sensed outside the pouch 10 while it is avoided to excessively emit the fragrance components so that the residue of the fragrance component in the contents runs short.

The proportion of the area of the fragrance component emission part 40 to that of a fragrance component emission area including the fragrance component emission part 40 (material removal parts 41) along the plane of the pouch (crowding of the material removal parts 41) is set in 2 to 60 area %, and preferably in 10 to 40 area %. The more the crowding of the material removal parts 41 is, the more the fragrance components are emitted. The crowding of the material removal parts 41 of 2 to 60 area % makes it possible for customers to surely notice the fragrance components while excessive emission of the fragrance components and the inflow of the external atmosphere into the accommodating part 30 are stopped and deterioration of the qualities of the contents, etc. are prevented.

The fragrance component emission area means an area including the fragrance component emission part 40 and its vicinities.

The proportion of the area of the material removal parts 41 to that of the fragrance component emission area along the plane of the pouch is calculated as follows: that is, assuming that a virtual region of a square 30 mm in length and 30 mm in width includes the material removal parts 41 in the fragrance component emission area; the proportion of the area of the material removal parts 41 to this virtual region is calculated, and the maximum value thereof is defined as a crowding of the material removal parts 41 in the fragrance component emission area.

The film 11 is formed to have such specific tensile strength that the tensile strength of the film 11 in the fragrance component emission area including the fragrance component emission part 40 in the width direction (X) of the pouch is at least 90 N/50 mm, and the tensile strength thereof in the height direction (Y) of the pouch is at least 125 N/50 mm.

It may be impossible that too low tensile strength in the width direction of the pouch, or too low tensile strength in the height direction of the pouch suppresses falling breakage such that the pouch is broken due to the increase in hydraulic pressure because of impacts of the fall when the pouch falls, starting from the material removal parts.

The pouch 10 according to the present embodiment is also formed in such a manner that especially when the film 11 is cut into a square 50 mm in length and 50 mm in width which leads to the maximum total area of the material removal parts 41 in the fragrance component emission area, the tensile strength of the cut portion of the film 11 in the width direction of the pouch is at least 90 N/50 mm and the tensile strength thereof in the height direction of the pouch is at least 125 N/50 mm.

The tensile strength of the film 11 is measured at 300 mm/min in tension speed using TENSILON universal testing instrument conforming to JIS K 7161. A chuck having a width of at least 50 mm is used for the measurement.

In the present invention, the width direction of the pouch 10 is defined as a direction horizontal to a bottom part of the pouch, and the height direction thereof is defined as a direction vertical to the bottom part of the pouch.

The size of the pouch 10 may be such that the length of the pouch in the width direction is, for example, 80 to 200 mm, the length of the pouch in the height direction is 100 to 300 mm, and the aspect ratio (length Y/length X) is approximately 1.5 to 3.0.

Mass of the liquid contents with which the accommodating part 30 of the pouch 10 is filled may be, for example, 50 g to 2000 g.

Figure 2:
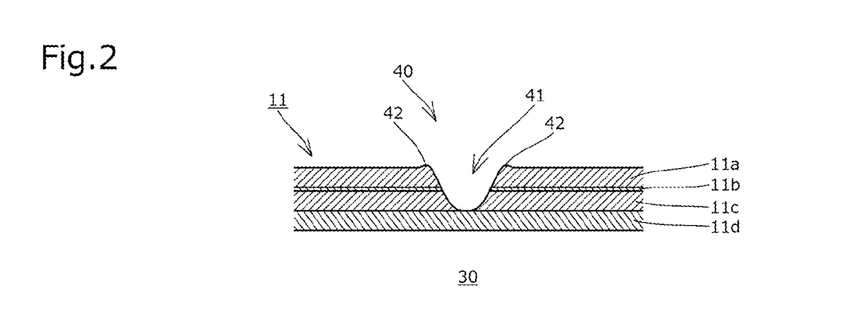
FIG. 2 explanatorily shows a structure of a film forming the pouch.

As shown in FIG. 2, a circumferential edge protruding part 42 that rises outside the outer surface of the film 11 is formed around the periphery of each of the material removal parts 41 in the form of grooves, which are formed on the outer surface of the film 11. When the material removal parts 41 are formed on the outer surface of the film 11 by laser irradiation, these circumferential edge protruding parts 42 are formed around the peripheries of the material removal parts 41 by heat in the laser irradiation.

The circumferential edge protruding part 42 is formed around the periphery of each of the material removal parts 41 in the form of grooves, which are formed on the outer surface of the film 11, whereby the circumferential edge protruding part 42 can suppress penetration of dust, moisture, etc. from the outside into each of the material removal parts 41 in the form of grooves, which makes it possible to avoid clogging of the material removal parts 41 in the form of grooves due to dust and moisture from the outside, to stably emit the fragrance components, and for customers to sense the presence and position of the fragrance component emission part 40 by their contact with the outer surface of the film 11. Formation of the material removal parts 41 in the form of grooves on the outer surface of the film 11 by laser irradiation can lead to formation of the material removal parts 41 in the form of grooves and the circumferential edge protruding parts 42 at the same time by heat in the laser irradiation, which makes it possible to avoid the increase in the load on production.

As shown in FIG. 2, the film 11 is formed of a plurality of layers laminated in the thickness direction. The material removal parts 41 (or scores) are formed so as to penetrate a plurality of layers forming the film 11 in the thickness direction except the innermost layer. In this embodiment, a PET (polyethyleneterephthalate) layer 11a, an aluminum-deposited layer 11b, a nylon layer 11c and the polyethylene layer 11d are laminated in the order mentioned from the outer surface side, to form the film 11. The material removal parts 41 are formed so as to penetrate a plurality of layers forming the film 11 (the PET layer 11a, the aluminum-deposited layer 11b and the nylon layer 11c) in the thickness direction except the innermost layer (polyethylene layer 11d). The material removal parts 41 (or scores) are formed so as to penetrate a plurality of layers forming the film 11 in the thickness direction except the innermost layer, whereby a layer separating the contents including the fragrance components and the outside is the innermost layer only, which makes it possible to surely emit the fragrance components.

A plurality of the layers forming the film 11 include a fragrance component barrier layer that suppresses transmission of the fragrance components therethrough. The fragrance component barrier layer included in a plurality of the layers forming the film 11 is formed so as to be penetrated in the thickness direction. In this embodiment, as shown in FIG. 2, the aluminum-deposited layer 11b, which is the fragrance component barrier layer (metal layer), is formed so as to be penetrated in the thickness direction.

The fragrance component barrier layer may be formed of aluminum foil, a metal-deposited layer, or an inorganic deposited film obtained by providing a polyester film or a polyamide film with an inorganic deposited layer. Examples of the inorganic deposited layer include deposited layers of metaloxides such as aluminumoxide, and deposited layers of inorganic oxides such as siliconoxide. The fragrance component barrier layer may be formed of a coating layer containing resin coating having barrier properties which is made from a polycarboxylic acid polymer and vinylidenechloride. The fragrance component barrier layer may be a film layer having barrier properties which is made from an ethylenevinyl alcohol copolymer.

A plurality of the layers forming the film include the fragrance component barrier layer, and the material removal parts 41 (or scores) penetrating the fragrance component barrier layer in the thickness direction is formed, whereby the material removal parts 41 (or scores) are formed so as to penetrate the fragrance component barrier layer suppressing transmission of the fragrance components therethrough and having high fragrance retention, in the thickness direction, which makes it possible to stably emit the fragrance components as storability of the liquid contents is kept. The fragrance component barrier layer includes a deposited layer of an inorganic oxide or a metal, whereby the material removal parts 41 (or scores) are formed in the fragrance component barrier layer surely suppressing transmission of the fragrance components therethrough and having high fragrance retention, which makes it possible to surely emit the fragrance components while storability of the contents is kept.

The material removal parts 41 are formed so as to penetrate the metal layer included in a plurality of the layers forming the film 11, in the thickness direction. In this embodiment, as shown in FIG. 2, the material removal parts 41 are formed so as to penetrate the aluminum-deposited layer 11b, which is the metal layer (fragrance component barrier layer), in the thickness direction.

Figure 3:
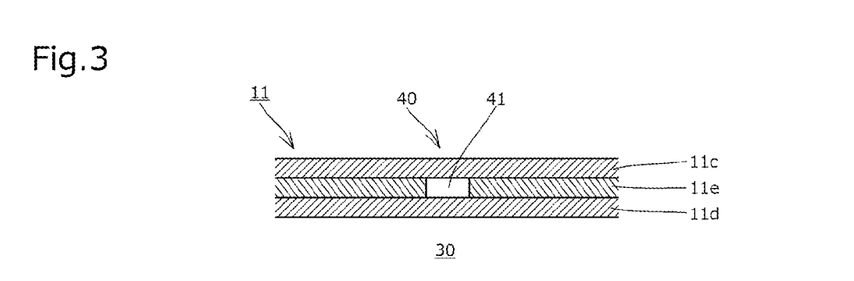
FIG. 3 explanatorily shows another structure of the film forming the pouch.

FIG. 3 shows another structure of the film 11. The film 11 is formed of the nylon layer 11c, an aluminum foil layer 11e, and the polyethylene layer 11d in the order mentioned from the outer surface side. In the case of this structure, the material removal parts 41 are formed in the aluminum foil layer 11e, which is the fragrance component barrier layer (metal layer), so as to penetrate the aluminum foil layer 11e.

The material removal parts 41 or scores are formed so as to penetrate the metal layer (aluminum-deposited layer 11b) in the thickness direction, whereby the material removal parts 41 or scores are formed in the metal layer having high fragrance retention, which makes it possible to stably emit the fragrance components.

The material removal parts 41 may be formed in at least part of a first synthetic resin layer made from a synthetic resin having a glass transition temperature higher than the other synthetic resin layers forming the film 11 so as to penetrate the first synthetic resin layer in the thickness direction. In this embodiment, as shown in FIG. 2, the material removal parts 41 are formed in the entire PET layer 11a, which is the first synthetic resin layer, in the thickness direction; and more specifically, are formed so as to penetrate the nylon layer 11c and the aluminum-deposited layer 11b in the thickness direction of the film 11. As the example in FIG. 2, the material removal parts 41 may have such a structure as to penetrate a plurality of layers forming the film 11 (the PET layer 11a, the aluminum-deposited layer 11b and the nylon layer 11c) in the thickness direction except the innermost layer (polyethylene layer 11d).

At least one kind of the material removal parts 41 and scores are formed in the first synthetic resin layer made from a synthetic resin having a glass transition temperature higher than the other synthetic resin layers, whereby the material removal parts or scores are formed in the first synthetic resin layer having a high glass transition temperature and high fragrance retention, which makes it possible to stably emit the fragrance components.

For example, the material removal parts 41 forming the fragrance component emission part 40 may be formed by laser irradiation. For the laser irradiation, a YAG laser, a carbon dioxide laser, an argon ion laser, or the like may be used.

A printed part (not shown) where characters, patterns, etc., are printed is formed on the film 11. The fragrance component emission part 40 is positioned with respect to the printed part along the plane of the pouch, to be formed. The fragrance component emission part 40 is positioned with respect to the printed part formed on the film 11 along the plane of the pouch, to be formed, whereby the material removal parts 41 or scores forming the fragrance component emission part may be used as part of a design on the outer surface of the film 11.

An embossed part (not shown) that is embossed is formed on the film 11. The fragrance component emission part 40 is positioned with respect to the embossed part along the plane of the pouch, to be formed. The fragrance component emission part 40 is positioned with respect to the embossed part formed on the film 11 along the plane of the pouch, to be formed: which can improve the design quality of the fragrance component emission part 40 and which improves the visibility of the position of the fragrance component emission part 40; and whereby lamination of the innermost layers (polyethylene layers 11d) can be suppressed, which can suppress blockage of emission of the fragrance components from the fragrance component emission part 40 and surely emit the fragrance components to the outside.

The embossed part is made in an air layer portion that is above the surface of the liquid, whereby the contents can be caught by the embossed part, which can continue a fragrance emission term.

[Liquid-Containing Pouch]

A liquid-containing pouch according to one embodiment of the present invention is such that the liquid contents are stored in the accommodating part 30 of the pouch 10.

In this embodiment, as shown in FIG. 1, the pouch 10 is formed as a freestanding pouch. The fragrance component emission part 40 is formed in at least one of the films on both sides so that the whole thereof is positioned under a surface L of the liquid contents in a state where the pouch 10, where the liquid contents are stored in the accommodating part 30 and which is unopened, stands.

The embodiments of the present invention have been described in detail. The present invention is not limited to the above embodiments, but various design modifications may be made therefor without deviating from the present invention of the claims. Any structure according to the above embodiments and any structure according to the following modifications may be combined.

For example, in the above embodiments, it is described that the entire fragrance component emission part 40 is formed in a position under the surface L of the liquid contents in a state where the pouch 10 in an unopened state stands. The entire fragrance component emission part 40 may be formed in a position over the surface L of the liquid contents. Alternately, the entire fragrance component emission part 40 may be formed in a position across the surface L of the liquid contents. The fragrance component emission part 40 may be formed at a position in an uppermost portion of the pouch 10 in a state where the pouch 10 stands, in view of improvement of customers' visibility. The fragrance component emission part 40 may be formed in an upper face if the pouch has the upper face. Further, if the pouch is formed as the above standing pouch, the fragrance component emission part 40 may be formed in a bottom material film. The structure such that the fragrance component emission part 40 is formed in a position across the surface L of the liquid contents in a state where the pouch 10 in an unopened state stands makes it possible to stably emit the fragrance components while breakage of the film 11 caused by hydraulic pressure is avoided. That is, the fragrance component emission part 40 is formed in a position where the material removal parts 41 (or scores) are immersed in the liquid contents while avoiding a lower position of the pouch 10 where a strong hydraulic pressure is applied to the films 11, which makes it possible to stably emit the fragrance components while breakage of the film 11 caused by hydraulic pressure is avoided. It is noted that formation of the entire fragrance component emission part 40 in a position under the surface L of the liquid is considered to most easily lead to falling breakage due to the increase in hydraulic pressure applied to the film 11 in falling. Therefore, the pouch 10 having a fragrance component emission area according to the present invention which has specific tensile strength offers sufficient resistance to falling breakage irrespective of the position where the fragrance component emission part 40 is formed, and irrespective of the posture in falling (such as a standing posture, an upside-down posture, a flat posture, etc. as in Experimental Examples described later in detail).

In the above embodiments, it is described that the structure of the film 11 is such that the PET layer 11a, the aluminum-deposited layer 11b, the nylon layer 11c and the polyethylene layer 11d are formed in the order mentioned from the outer surface side. A specific structure of the film 11 may be any: for example, the nylon layer 11c and the polyethylene layer 11d are formed in the order mentioned from the outer surface side.

As the structure of the film 11 except the foregoing, the following are given: PET layer/aluminum foil layer/nylon layer/linear low density polyethylene layer, PET layer/nylon layer/aluminum foil layer/linear low density polyethylene layer, nylon layer/aluminum foil layer/linear low density polyethylene layer, PET layer/aluminum-deposited PET layer/linear low density polyethylene layer, nylon layer/aluminum-deposited PET layer/linear low density polyethylene layer, aluminumoxide-deposited PET layer/linear low density polyethylene layer, siliconoxide-deposited PET layer/linear low density polyethylene layer, aluminumoxide-deposited PET layer/nylon layer/linear low density polyethylene layer, and siliconoxide-deposited PET layer/nylon layer/linear low density polyethylene layer, etc. each in the order mentioned from the outer surface side. As the innermost layer, which is a layer to be heat-sealed on the innermost side, a polypropylene layer may be used other than the foregoing.

In the above embodiments, it is described that the contents stored in the accommodating part 30 of the pouch 10 are liquids such as a shampoo, a rinse, a conditioner, a detergent, and a softening agent. A specific aspect of the contents in the pouch 10 is not limited to the above. For example, the contents may be a fluid obtained by mixing a solid and a liquid, and may be a solid. The contents stored in the accommodating part 30 of the pouch 10 are not limited to a non-food as described above, but may be a food such as coffee beans, black tea leaves, and a curry. Further, the contents stored in the accommodating part 30 of the pouch 10 may be a drink such as a liquid coffee. It is noted that the liquid contents are considered to most easily lead to falling breakage. Therefore, the pouch 10 having a fragrance component emission area according to the present invention which has specific tensile strength offers sufficient resistance to falling breakage even if the contents are a fluid or a solid.

In the above embodiments, it is described that the pouch 10 is a type of a standing pouch. As a specific aspect of the pouch 10, various forms may be employed such as a pillow-type pouch, a gusset-type pouch, a flat pouch encompassing a sachet, a box pouch, and a pouch with a zipper.

In the above embodiments, it is described that the fragrance component emission part 40 is formed in only one of the films 11 on both sides. The fragrance component emission part 40 may be formed in each of the films 11 on both sides.

In the above embodiments, it is described that the fragrance component emission part 40 is composed of the material removal parts 41, which are formed by removing parts of the film 11. The fragrance component emission part 40 may be composed of a slit in the form of a notch without removal of part of the film 11. The fragrance component emission part 40 may be composed of the material removal parts 41 and (a) slit(s).

In the above embodiments, it is described that the material removal parts 41 (or slit(s)) composing the fragrance component emission part 40 are formed in the outer surface of the film 11. The position where the material removal parts 41 (or scores) composing the fragrance component emission part 40 are formed is not limited to the foregoing. The material removal parts 41 (or scores) may be formed in at least one of the outer surface of the film 11, the inner surface of the film 11 (that is, the surface facing the accommodating part 30 side), and the inside of the film 11 (that is, a portion inside the inner surface and the outer surface in the thickness direction). When the material removal parts 41 are formed in the inner surface of the film 11 by laser irradiation, the circumferential edge protruding parts are formed around the peripheries of the material removal parts 41 as well as the circumferential edge protruding part 42 shown in FIG. 2. The fragrance component emission part 40 is composed of the material removal parts in the form of grooves, which are formed from the inner surface of the film 11 to the middle in the thickness direction, whereby the contents including fragrance components can be caught by the material removal parts 41 in the form of grooves, which are formed in the inner surface of the film 11, so that the fragrance components can be stably emitted from the fragrance component emission part 40 according to, for example, the posture where the pouch 10 is placed even if the contents are not positioned in the vicinity of the fragrance component emission part 40. When the circumferential edge protruding parts 42 are formed around the peripheries of the material removal parts 41 in the form of grooves, which are formed in the inner surface of the film 11, the volume of the contents caught by the material removal parts 41 in the form of grooves can be increased, which makes it possible to stably emit the fragrance components from the fragrance component emission part 40. The material removal parts 41 in the form of grooves are formed in the inner surface of the film by laser irradiation, whereby the material removal parts 41 in the form of grooves and the circumferential edge protruding parts 42 can be formed at the same time by heat in the laser irradiation, which makes it possible to avoid the increase in the load on production.

In the above embodiments, it is described that the entire fragrance component emission part 40 is formed at a position corresponding to the accommodating part 30. Part of the fragrance component emission part 40 may be formed at a position corresponding to the outer peripheral sealing part 20.

In the above embodiments, it is described that laser irradiation is used as a processing means for the material removal parts 41. The processing means for the material removal parts 41 or scores is not limited to the foregoing. For example, the material removal parts 41 or scores may be formed by half-cutting, cutting, grinding, or the like using a jig such as a cutting tool. The processing method for the material removal parts 41 or scores in the pouch 10 is not limited to laser processing (laser irradiation) and the like on the film 11 when the film 11 is made of a plurality of the layers. In this case, only the fragrance component barrier layer, or material layers including the fragrance component barrier layer is/are subjected to laser processing by laser irradiation, or cutting with a cutting tool before each layer is laminated so as to form the film 11, and thereafter a predetermined material layer (such as the innermost layer) is laminated to form the film 11. The material removal parts 41 or scores may be formed according to this.

Figure 4:
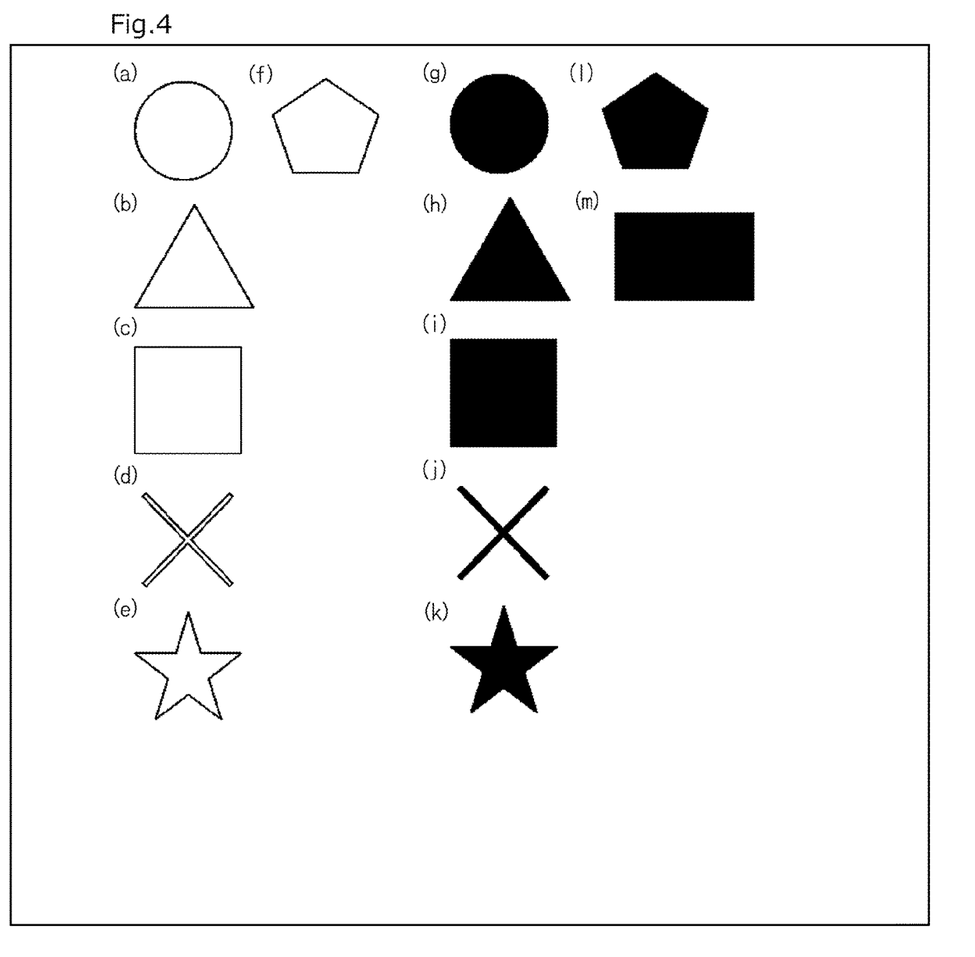
FIG. 4 explanatorily shows other examples of a planar shape of a fragrance component emission part.
Figure 5:
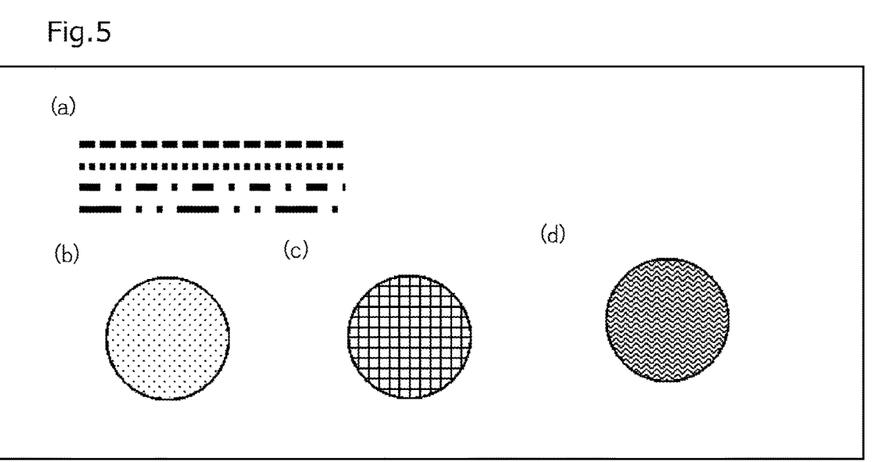
FIG. 5 explanatorily shows other examples of a planar shape of the fragrance component emission part further.
Figure 6:
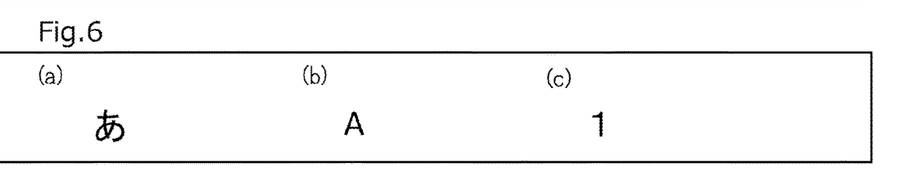
FIG. 6 explanatorily shows examples of a design of the fragrance component emission part.
Figure 7:
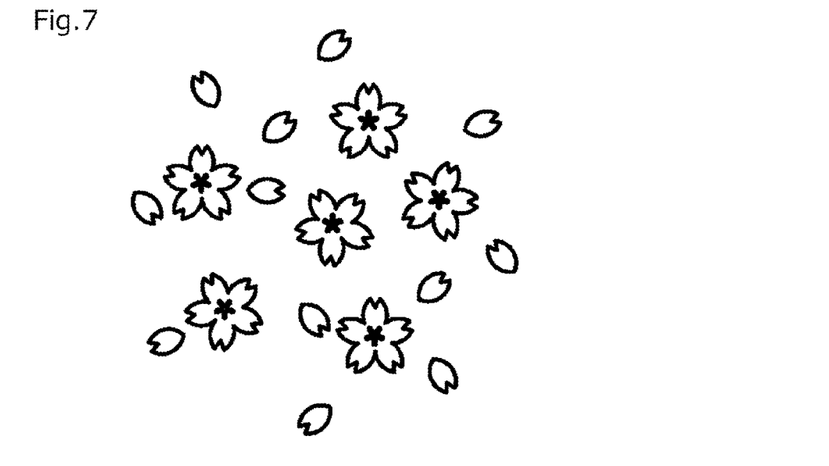
FIG. 7 explanatorily shows another example of a design of the fragrance component emission part.

In the above embodiments, it is described that the fragrance component emission part 40 is composed of a gathering of the material removal parts 41 linearly extending along the plane of the pouch. A specific aspect of the fragrance component emission part 40 is not limited to the above. For example, the fragrance component emission part 40 may be composed of a part linearly extending along the plane of the pouch, a part formed in a planar form, a dotted part, a part in the form of a dashed dotted line or a dashed line, and any gathering in combination thereof. In view of high resistance to falling breakage, the fragrance component emission part 40 is more preferably composed of a part of a discontinuous shape such as a dot and a dashed line than a part in the form of a continuous line. FIG. 4(*a*) to (*f*) shows examples of the fragrance component emission part 40, which is composed of one linearly extending material removal part 41. FIG. 4(*g*) to (*m*) shows examples of the fragrance component emission part 40, which is composed of the material removal part 41 formed to have a planar shape. FIG. 5(*a*) shows an example of the fragrance component emission part 40, which is composed of a gathering of the material removal parts 41 in the form of dashed lines. FIG. 5(*b*) shows an example of the fragrance component emission part 40, which is composed of dotted material removal parts 41 and one linearly extending material removal part 41. FIGS. 5(*c*) and (*d*) shows other examples of the fragrance component emission part 40, which is composed of a gathering of a plurality of the linear material removal parts 41. As shown in FIG. 6(*a*) to (*c*), the fragrance component emission part 40 may be composed of the material removal part 41 having a shape of a meaningful character, number or symbol. As shown in FIG. 7, the material removal parts 41 may be formed to have a shape of a pattern having a design quality. The material removal parts 41 may be such as to be viewed spirally. In FIG. 4 to FIG. 7, the black colored areas are the material removal parts 41.

The processing shapes, the processing positions, and the areas of the material removal parts 41 or scores composing the fragrance component emission part 40 may be changed according to how strong fragrance of the contents is, so that how much fragrance is emitted can be adjusted.

Experimental Examples of the present invention will be hereinafter descried.

Experimental Example a

Standing pouches were prepared. In each of the standing pouches, the linear material removal part 41 (0.4 mm in width) extending in the lateral direction (width direction of the pouch) shown in FIG. 8A was formed at a position shown in FIG. 8A using a film obtained by laminating a PET layer (outermost layer) having a thickness of 12 µm, an aluminum-deposited PET layer having a thickness of 12 µm, and a linear low density polyethylene layer (innermost layer) having a thickness of 130 µm in the order mentioned. The processing lengths of the material removal parts 41 were as in Table 1. The material removal parts 41 were each formed by removing the aluminum-deposited PET layer and the PET layer by laser processing so that the aluminum-deposited PET layer and the PET layer were all penetrated in the thickness direction without removing the polyethylene layer (innermost layer).

The accommodating part 30 of each of the pouches was filled with 720 mL of water at 5° C., and the liquid was sealed in by heat sealing along the outer peripheral sealing part 20.

They were defined as pouches [a1] to [a4] respectively. Three groups each made up of the pouches [a1] to [a4] were prepared. Among them, the pouches given the same reference sign were completely the same.

These pouches [a1] to [a4] each had a length in the width direction of the pouch of 140 mm, a length in the height direction of the pouch of 270 mm, and a width of a bottom portion of 38 mm.

Figure 8A:
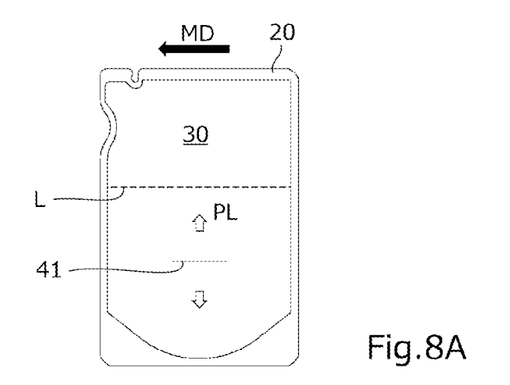

For the pouches [a1] to [a4], the width directions of the pouches were horizontal to bottom parts thereof, which were shown by the arrow MD in FIG. 8A.

Experimental Example b

Figure 8B:
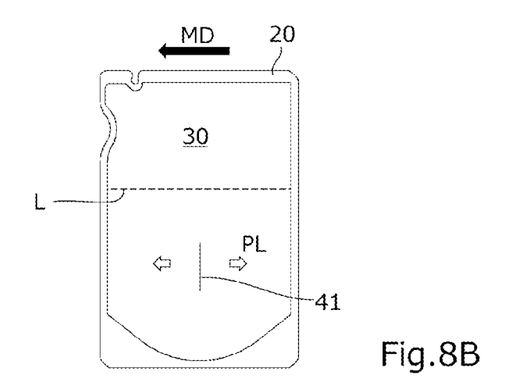
FIG. 8B explanatorily shows an example of a pouch used in Experimental Example b.

Three groups each made up of pouches [b1] to [b5] were prepared in the same manner as in Experimental Example a except that the linear material removal parts 41 (0.4 mm in width each) having the processing lengths shown in Table 1 and extending in the longitudinal direction were formed. The planar shape of the material removal parts 41 is shown in FIG. 8B.

Experimental Example c

Figure 8C:
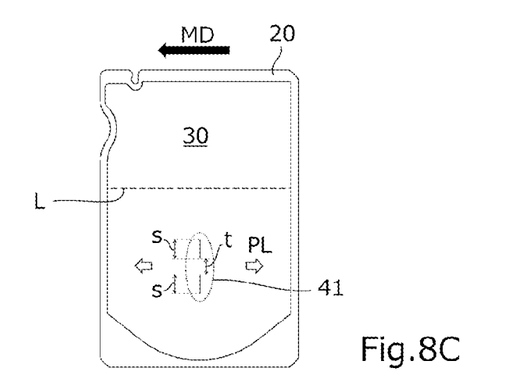
FIG. 8C explanatorily shows an example of a pouch used in Experimental Example c.

Three groups each made up of pouches [c1] to [c9] were prepared in the same manner as in Experimental Example a except that the material removal parts 41 in the form of dashed lines (0.4 mm in width each) having the processing lengths and clearance lengths shown in Table 1 and extending in the longitudinal direction were formed. The planar shape of the material removal parts 41 is shown in FIG. 8C.

Experimental Example d

Figure 8D:
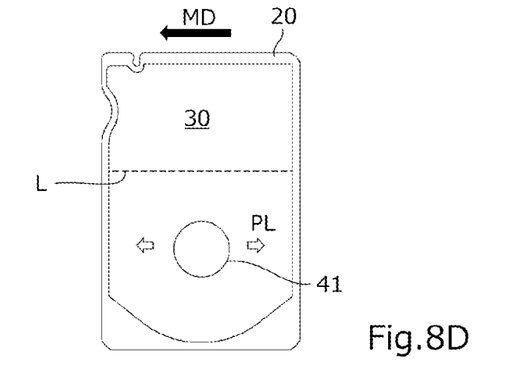
FIG. 8D explanatorily shows an example of a pouch used in Experimental Example d.

Three groups each made up of pouches [d1] to [d3] were prepared in the same manner as in Experimental Example a except that the material removal parts 41 in the form of circles having diameters shown in Table 1 (0.4 mm in width each) were formed. The planar shape of the material removal parts 41 is shown in FIG. 8D.

Experimental Example e

Figure 8E:
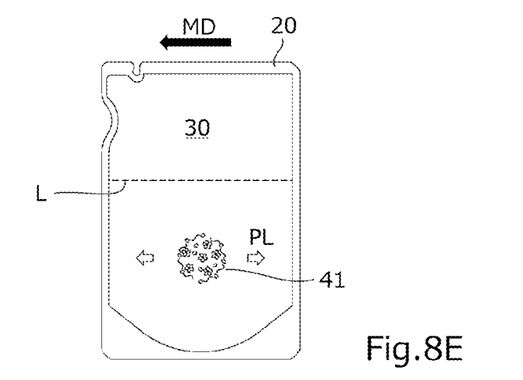
FIG. 8E explanatorily shows an example of a pouch used in Experimental Example e.
Figure 8F:
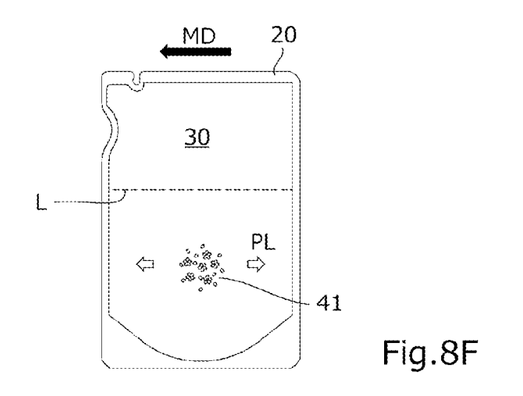
FIG. 8F explanatorily shows an example of a pouch used in Experimental Example e.

Three groups each made up of pouches [e1] to [e2] were prepared in the same manner as in Experimental Example a except that the material removal parts 41 of linear designs having planar shapes shown in FIG. 8E or FIG. 8F (0.4 mm in width of each line) and having the total lengths shown in Table 1 were formed. The design of the material removal part 41 of the pouch [e1] is shown in FIG. 8E. The design of the material removal part 41 of the pouch [e2] is shown in FIG. 8F.

A square 50 mm in length and 50 mm in width which led to the largest area of the material removal part 41 was cut out from each of the films of one group of the pouches [a1] to [a4], [b1] to [b5], [c1] to [c9], [d1] to [d3] and [e1] to [e2], and the tensile strength thereof in the draw direction shown in Table 1 (shown by the arrows PL in FIG. 8A, FIG. 8B, FIG. 8C, FIG. 8D, FIG. 8E and FIG. 8F) was measured. The results are shown in Table 1.

A drop test such that these pouches [a1] to [a4], [b1] to [b5], [c1] to [c9], [d1] to [d3] and [e1] to [e2] in another group were each made to freely fall from the height of 80 cm to the surface of a floor as the pouch stood with the bottom part thereof downward was done ten times repeatedly. Further, a drop test such that the corresponding pouches in the rest group were each made to freely fall from the height of 80 cm to the surface of a floor as the pouch was in a flat posture with a side face thereof downward was done ten times repeatedly. Then, the strength for falling breakage was evaluated according to the following criteria for evaluation. The results are shown in Table 1.

—Criteria for Evaluation of Strength for Falling Breakage—
∘: no breakage in the ten tests
x: any breakage in the ten tests

REFERENCE SIGNS LIST

10 Pouch
11 Film
11*a* PET layer (first synthetic resin layer)
11*b* Aluminum-deposited layer (metal layer)
11*c* Nylon layer
11*d* Polyethylene layer
11*e* Aluminum foil layer (metal layer)
20 Outer peripheral sealing part
30 Accommodating part
40 Fragrance component emission part
41 Material removal part
42 Circumferential edge protruding part

The invention claimed is:

1. A pouch formed into a bag by thermally bonding a film to form an outer peripheral sealing part, the pouch including an accommodating part, in which liquid contents are stored, on an inside of the outer peripheral sealing part, wherein a fragrance component emission part is formed in the film on at least one side thereof at a position corresponding to the accommodating part, the fragrance component emission part is composed of at least one of a material removal part or a score, which has a notch form, in a range of part of the film in a thickness direction, and

TABLE 1

| | Experimental Example a | | | | Experimental Example b | | | | |
| --- | --- | --- | --- | --- | --- | --- | --- | --- | --- |
| | Draw direction | | | | | | | | |
| | Vertical to MD | | | | Parallel to MD | | | | |
| No. of pouch | a1 | a2 | a3 | a4 | b1 | b2 | b3 | b4 | b5 |
| Processing length [mm] | 48 | 40 | 20 | 10 | 40 | 30 | 20 | 10 | 5 |
| Strength for falling breakage | x | ∘ | ∘ | ∘ | x | ∘ | ∘ | ∘ | ∘ |
| Tensile strength. [N/50 mm] | 86 | 93 | 112 | 132 | 120 | 125 | 132 | 148 | 148 |

| | Experimental Example c | | | | | | | | |
| --- | --- | --- | --- | --- | --- | --- | --- | --- | --- |
| | Draw direction | | | | | | | | |
| | Parallel to MD | | | | | | | | |
| No. of pouch | c1 | c2 | c3 | c4 | c5 | c6 | c7 | c8 | c9 |
| Processing length s [mm] | 5 | 5 | 5 | 5 | 5 | 4 | 4 | 4 | 4 |
| Clearance length t [mm] | 5 | 4 | 3 | 2 | 1 | 4 | 3 | 2 | 1 |
| Strength for falling breakage | ∘ | ∘ | ∘ | ∘ | ∘ | ∘ | ∘ | ∘ | ∘ |
| Tensile strength [N/50 mm] | 147 | 169 | 164 | 157 | 148 | 132 | 142 | 144 | 136 |

| | Experimental Example d | | | Experimental Example e | |
| --- | --- | --- | --- | --- | --- |
| | Draw direction | | | | |
| | Parallel to MD | | | Parallel to MD | |
| No. of pouch | d1 | d2 | d3 | e1 | e2 |
| Processing length [mm] | Φ20 | Φ10 | Φ5 | 341 | 266 |
| Strength for falling breakage | ∘ | ∘ | ∘ | ∘ | ∘ |
| Tensile strength [N/50 mm] | 144 | 157 | 151 | 128 | 182 | tensile strength of the film in a fragrance component emission area including the fragrance component emission part in a width direction of the pouch is at least 90 N/50 mm, and tensile strength thereof in a height direction of the pouch is at least 125 N/50 mm, wherein the material removal parts or scores are formed so as to penetrate a plurality of layers forming the film in the thickness direction except an innermost layer among the plurality of layers forming the film, wherein the accommodating part, in which the liquid contents are stored, is surrounded by the film on a front and back, wherein the plurality of the layers forming the film include a fragrance component barrier layer that suppresses transmission of the fragrance components therethrough, wherein the fragrance component barrier layer has either an inorganic deposited film provided with an inorganic deposited layer, or a coating layer containing a barrier resin coating agent, wherein a circumferential edge protruding part is formed at a circumferential edge of the material removal parts or scores in a groove shape formed at an inner surface of the film, and wherein the circumferential edge protruding part rising outwardly from an outer surface of the film is integrally continuous with an outermost layer.

2. The pouch according to claim 1, wherein the fragrance component emission part is composed of at least the material removal part, and tensile strength of part of the film in the fragrance component emission area in the width direction of the pouch, with the part being a square of 50 mm in length and 50 mm in width which leads to a largest total area of the material removal part, is at least 90 N/50 mm, and tensile strength thereof in the height direction of the pouch is at least 125 N/50 mm.

3. A liquid-containing pouch comprising:

the pouch according to claim 1; and liquid contents stored in the accommodating part, wherein the pouch is formed as a standing pouch, and at least part of the fragrance component emission part is formed in a position across a liquid surface of the liquid contents, or in a position under the liquid surface, in a state where the pouch in an unopened state stands.

* * * * *